United States Patent [19]

Kisselow et al.

[11] 4,129,512

[45] Dec. 12, 1978

[54] LUBRICATING GREASES

[75] Inventors: Alexander W. Kisselow, Hamburg; Peter K. Wulk, Wedel, Holst, both of Fed. Rep. of Germany

[73] Assignee: The British Petroleum Company Limited, Sunbury-on-Thames, England

[21] Appl. No.: 876,018

[22] Filed: Feb. 8, 1978

Related U.S. Application Data

[63] Continuation of Ser. No. 765,375, Feb. 3, 1977, abandoned.

[30] Foreign Application Priority Data

Feb. 5, 1976 [DE] Fed. Rep. of Germany ....... 2604342

[51] Int. Cl.$^2$ .................. C10M 1/32; C10M 3/26; C10M 5/20; C10M 7/30

[52] U.S. Cl. .............................. 252/51.5 A
[58] Field of Search .................. 252/51.5 A

[56] References Cited

U.S. PATENT DOCUMENTS 3,870,642   3/1975   Gegner ..................... 252/51.5 A

*Primary Examiner*—Irving Vaughn
*Attorney, Agent, or Firm*—Morgan, Finnegan, Pine, Foley & Lee

[57] ABSTRACT

The polyurea thickener of a polyurea grease is prepared from:
(a) a mixture of aliphatic and aromatic monoamines
(b) one or more aromatic di-isocyanates
(c) a diamine which is 4,17-dioxaeicosandiamine-1,20 and which has the formula
$H_2N-(CH_2)_3-O-(CH_2)_{12}-O-(CH_2)_3-NH_2$

9 Claims, No Drawings

LUBRICATING GREASES

This is a continuation of application Ser. No. 765,375 filed Feb. 3, 1977 now abandoned.

This invention relates to a process for the production of polyurea lubricating greases by the reaction of a monoamino, a diamino and a di-isocyanato component in a lubricating oil, and also to lubricating greases obtained by the process.

Lubricating greases of the type mentioned above with polyureas as thickeners are already known. Thus, for example, U.S. Pat. No. 3,243,372 describes lubricating greases which contain polyureas of the general formula:

R'—NH(CO-NHR'''—NH—CO—NHR—NH)$_x$
CO—NHR'''—NH—CO—NHR'', in which R' and R'' are monovalent hydrocarbon radicals, R and R''' are divalent hydrocarbon radicals, and x is a whole number from 1 to 3.

Lubricating greases according to U.S. Pat. No. 3,243,372 are produced by dissolving a di-isocyanate in the lubricating oil which is to be thickened, possibly with the aid of a further solvent, adding amines to the mixture and then heating the total mixture so that a polyurea is formed in situ.

Lubricating greases with polyureas as thickeners are chemically resistant to water and oxidation; they decompose under the action of heat only at comparatively high temperatures.

West German Patent Specification No. 2,260,496 describes a process for the production of a improved polyurea lubricating greases by the reaction of a monoamino, a diamino and a di-isocyanato component in a lubricating oil at elevated temperature, which is characterised in that:

(a) the monoamino component is a mixture of at least one representative of at least two of the classes of compounds of the general formula

R—NH$_2$,

R'—NH$_2$ and

R''—O—R'''—NH$_2$, in which R and R'' are monovalent aliphatic radicals, R' is a monovalent aromatic radical, and R''' is a divalent aliphatic radical, (b) the diamino component is a dioxa-alkane-diamine or a mixture of dioxa-alkane-diamines of the general formula:

NH$_2$—R—O—R'—O-R''—NH$_2$ in which R, R' and R'' are divalent aliphatic radicals, (c) the di-isocyanato component is an aromatic di-isocyanate or a mixture of aromatic di-isocyanates, in which the two isocyanato groups in the molecules are joined with the same aromatic ring or with different aromatic rings.

The lubricating greases of West German Patent Specification 2,260,496 have good chemical resistance to water, oxidation and heat; they also have good load-carrying properties and excellent mechanical stability. Furthermore, they have an extremely low tendency to gelling or hardening. Nevertheless, further improvements to increase the versatility of polyurea greases are desirable. Thus there is a potential need for lubricant greases with improved shear stability over long periods of time at normal and elevated temperature. Naturally, such lubricating greases should retain the good properties of the known polyurea greases.

It has now surprisingly been found that lubricating greases with good mechanical/dynamic behaviour, excellent stability to working, very good load-carrying capacity and excellent chemical and thermal resistance are obtained if, in the process for the production of lubricating greases according to West German Patent Specification 2,260,496, a particular dioxa-alkane-diamine is used.

Thus according to the present invention, a process for the production of polyurea lubricating greases by the reaction in a lubricating oil, of (a) a monoamino component, consisting of a mixture of at least one representative of each of the classes of compounds of general formulae R—NH$_2$ and R'—NH$_2$ in which R is a monovalent aliphatic and R' is a monovalent aromatic radical, (b) a diamino component of the general formula:

NH$_2$—R—O—R'—O—R''—NH$_2$, in which R, R' and R'' are divalent aliphatic radicals (c) a di-isocyanato component, consisting of an aromatic di-isocyanate or a mixture of aromatic di-isocyanates, the two isocyanato groups in the molecules being connected with the same aromatic ring or with different aromatic rings, is characterised in that the diamino component is:
4,17-dioxaeicosandiamine-1,20
having the formula:

H$_2$N—(CH$_2$)$_3$—O—(CH$_2$)$_{12}$—O—(CH$_2$)$_3$—NH$_2$

The improved properties of the lubricating greases produced according to the invention could not have been predicted. According to West German Patent Specification 2,260,496, in fact, the dioxa-alkane-diamines of the general formula:

NH$_2$—R—O—R'—O—R''—NH$_2$ should preferably be those in which the radicals R and R'' have from 2 to 4 carbon atoms and in which the radical R' has from 2 to 10 carbon atoms. The particularly preferred dioxa-alkane-diamines are those in which the radicals R and R'' have from 2 to 3 carbon atoms and in which the radical R' has from 4 to 6 carbon atoms.

The 4,17-dioxaeicosandiamine-1,20 used in the present invention is a known compound which can be readily prepared. No claim is made to the compound or its preparation.

The components of the grease are preferably reacted with one another in the lubricating oil at a temperature of from 20° to 150° C, most preferably at from 40° to 70° C.

If desired, the mixture obtained may then be heated further to a temperature of 150° to 200° C, preferably to about 175° C. By means of this reaction under controlled conditions an additional improvement in the properties of the lubricating greases of the invention may be obtained, which may be attributed to transamidation and cross-linking reactions of the polyurea.

According to a further preferred embodiment of the invention, the di-isocyanate component is added to the mixture of monoamino and diamino components in the lubricating oil. The di-isocyanate component may be added directly at a temperature which is above its melting point, or it may be added dissolved in a lubricating oil or in a solvent which in inert under the reaction conditions. In this way there is an excess of amines as compared with the di-isocyanate component for most of the reaction, as a result of which the degree of branching or cross-linking of the polyureas in the lubricating grease is controlled in an advantageous manner.

The molar ratio between the monoamino component, the diamino component and the di-isocyanate component is preferably within the range from 2:1:2 to 2:1:2.5 or in the range from 2:2:3 to 2:2:3.75. In the case of a stoichiometric excess of di-isocyanato component, additional cross-linkages or branches occur in the polyurea chains, as a result of which the useful properties of the lubricating greases according to the invention can be improved still further.

The monoamino component may contain the aliphatic monoamine or the mixture of aliphatic monoamines and the aromatic mono-amine or the mixture of aromatic monoamines in the proportion of 6:4 to 4:6, preferably in the proportion of 1:1.

The aliphatic monoamino component is preferably a straight-chain aliphatic monoamine with from 12 to 24 carbon atoms, preferably from 16 to 24 carbon atoms, or mixtures of such monoamines.

The aromatic monoamino component is preferably aniline, toluidine or xylidine or mixtures of these amines. Isomeric aromatic monoamines can be used either individually or as a mixture of isomers.

The aromatic di-isocyanato component is preferably phenylene, toluylene, ditolylene, naphthylene or diphenylenemethane di-isocyanate or mixtures thereof.

Isomeric di-isocyanates can be used either individually or as isomer mixtures.

Preferably after cooling of the grease to about 100° C., conventional lubricating grease additives may be included in the greases. Suitable additives include extreme pressure (EP) additives, and oxidation and corrosion inhibitors.

After cooling, the lubricating greases obtained may be homogenised in known manner.

Prior to homogenisation, a further quantity of lubricating oil may be added, if a higher concentration of thickener in the reaction mixture has been produced than is required for the finished lubricating grease.

Preferably the concentration of thickener in the final lubricating grease is in the range from 3 to 30% by weight.

According to the present invention any lubricating oil can be thickened. Suitable oils, for example, are paraffinic or naphthenic mineral oil fractions boiling in the lubricating oil boiling range or mixtures of such fractions, as well as synthetic lubricating oils such as polyaryl ethers, polyalkyleneglycols, polysiloxanes and polyolefins, and also ester oils obtained, for example, by the reaction of monobasic and/or polybasic carboxylic acids with monohydric and/or polyhydric alcohols.

The invention is illustrated by the following comparative examples in which Example 1 is an example of the present invention and Example 2 is a comparative example. Example 2 is, in fact, the same as Example 1 of West German Patent Specification 2,260,496, and describes the preparation of a grease of the same NLGI class (classification according to the National Lubricating Grease Institute) as Example 1.

EXAMPLE 1

A mixture of 75.6 g of 4,17-dioxaeicosandiamine-1,20, 25.6 g of p-toluidine and 73.5 g of Genamine ® 20/22 R 100 D (a mixture of primary aliphatic amines with chain lengths of $C_{18}$, $C_{20}$, $C_{22}$ and $C_{24}$ in the proportion of 4:39:54:3) and 1,500 g of a naphthenic solvent raffinate (with a vicosity of 5° E/50° C. corresponding to 27.5 cSt/50° C.) is heated with stirring to 60° C. The amines melt and form with the mineral oil a clear solution. 85.3 g of Desmodur ® T 65 (a mixture of 65% 2,4- and 35% 2,6-toluylene di-isocyanate) are added drop by drop with continuous intensive stirring within a period of 15 minutes. The turbidity which shows at once increases rapidly and the total reactor content thickens. A further 100 g of the same base oil are then added through the di-isocyanate feed vessel. The reaction mixture is heated with further stirring to 175° C, after which the temperature is allowed to cool to 100° C. A mixture of 10 g of Amine ® T (a corrosion inhibitor of Ciba Geigy), 20 g of Additin ® 30 (an oxidation inhibitor of Bayer AG) and 110 g of base oil, is then added and the grease is allowed to cool to room temperature. The lubricating grease is then homogenised in a colloid mill.

EXAMPLE 2

A mixture of 42.2 g of 4,9-dioxadodecane-1,12-diamine, 63.6 g of Genamin ® 20/22 R 100 D (a mixture of primary amines with chain lengths of $C_{18}$, $C_{20}$, $C_{22}$ and $C_{24}$ in the proportion of 4:39:54:3), 22.2 g of p-toluidine and 1,500 g of a mixed-base solvent raffinate (with a viscosity of 14° E/50° C. corresponding to 105 cSt/50° C) is heated with stirring to 60° C. At this temperature the amines form a clear solution with the mineral oil. 72.0 g of Desmodur ® T 65 (a mixture of 65% 2,4- and 35% 2,6-toluylene di-isocyanate) are added drop by drop within 10 minutes with continuous, intensive stirring. The turbidity which shows at once rapidly increases and the total reactor contents thicken. A further 100 g of the same base oil are then added via the di-isocyanate feed vessel. The reaction mixture is heated with further stirring to 175° C., after which the temperature is allowed to cool to 100° C. A mixture of 10 g Amine ® T (a corrosion inhibitor of Ciba-Geigy), 20 g of Additin ® 30 (an oxidation inhibitor of Farbenfabriken Bayer), 2 g of Reomet ® SBT (a metal deactivator of Ciba-Geigy) and 168 g of base oil is then added and the grease is allowed to cool, with stirring, to room temperature. After cooling, the lubricating grease is homogenised in a colloid mill.

The greases of Examples 1 and 2 were subjected to various tests. The tests used and results obtained are shown in Table 1 below.

Table 1

|  | Grease of Example 1 (present invention) | Grease of Example 2 (comparative grease) |
|---|---|---|
| Thickener content: | 13% by wt. | 10% by wt. |

Table 1-continued

| | Grease of Example 1 (present invention) | Grease of Example 2 (comparative grease) |
|---|---|---|
| Dropping point (DIN 51 801, Sheet 1): | 232° C | 220° C |
| Worked penetration (DIN 51 804, Sheet 2): | 313 | 287 |
| Change in penetration between 60 DH and 100,000 DH: | +47 | +163 |
| Change in the worked penetration in the Shell Roller Test | | |
| a) after 48 hours at 25° C | +76 | +146 |
| b) after 48 hours at 90° C | +90 | +146 |
| Corrosion index according to Encor Test (DIN 51 802): | 0 | 0 |
| Oil Separation according to IP 121/63 (1 week, 40° C): | 3.3% by wt. | 1.3% by wt. |
| Mechanical/dynamic SKF test | | |
| A run (2,500 r.p.m., without heating): | withstood excellently | withstood |
| Results of the A run | | |
| Wear of the cage rings: | 9 mg | 75 mg |
| Wear of the rollers: | 2 mg | 49 mg |
| Quantity of residual grease: | very good (93.6% by wt) | very good (93.3% by wt) |
| Oil carbon: | Note 2 (small tarry residue) | Note 2 (slight tarry residue) |
| Dry run: | None | None |
| B Run (1,500 r.p.m., 150° C): | withstood well | withstood |
| Results of the B run | | |
| Wear of the cage rings: | 33 mg | 16 mg |
| Wear of the rollers: | 23 mg | 21 mg |
| Quantity of residual grease: | good (88% by wt) | adequate (71% by wt) |
| Oil carbon: | Note 2 (slight tarry residue) | Note 3 (thick asphalt-type residue) |
| Dry run: | None | None |

Table 1 shows that the lubricating grease according to the invention is considerably superior to the lubricating grease of the comparative example as regards stability to working (change in the penetration between 100,000 double strokes and 60 double strokes and also change in the worked penetration in the Shell roller test) and in regard to its mechanical/dynamic behaviour as measured by the SKF test.

These advantages are considered to outweigh any disadvantage in the rather higher oil separation and the somewhat lower thickening capacity of the polyurea.

We claim:

1. A process for the production of polyurea lubricating greases by the reaction, in a lubricating oil, of
    (a) a mono-amino component consisting of a mixture of at least one representative of each of the classes of compounds of general formulae:

R—NH$_2$ and

R'—NH$_2$ in which R is a monovalent aliphatic and R' is a monovalent aromatic radical,
    (b) a diamino component of the general formula:

NH$_2$—R—O—R'—O—R"—NH$_2$, in which R, R' and R" are divalent aliphatic radicals,
    (c) is di-isocyanato component consisting of an aromatic di-isocyanate or a mixture of aromatic di-isocyanates, the two isocyanate groups in the molecules being connected with the same aromatic ring or with different aromatic rings,
characterised in that the diamino component is: 4,17-dioxaeicosandiamine-1,20 having the formula

H$_2$N—(CH$_2$)$_3$—O—(CH$_2$)$_{12}$—O—(CH$_2$)$_3$—NH$_2$

2. A process as claimed in claim 1 wherein the components are reacted in a lubricating oil at a temperature of 20° to 150° C. and the mixture obtained is heated to a temperature of 150° to 200° C.

3. A process as claimed in claim 1 wherein the di-isocyanato component is added to a mixture of mono-amino and diamino components and a lubricating oil.

4. A process as claimed in claim 1 wherein the molar ratio of mono-amino, diamino and di-isocyanato components is in the range from 2:1:2 to 2:1:2.5 or in the range from 2:2:3 to 2:2:3.75.

5. A process as claimed in claim 1 wherein, in the monoamino component, the molar ratio of aliphatic monoamine or aliphatic monoamines of the general formula:

R—NH$_2$ to aromatic monoamine or aromatic monoamines of the general formula:

R'—NH$_2$ is in the range from 6:4 to 4:6 and preferably is 1:1.

6. A process as claimed in claim 1 wherein the aliphatic monoamine is a straight-chain mono-amine with 12 to 24 carbon atoms, or a mixture of such mono-amines.

7. A process as claimed in claim 1 wherein the aromatic mono-amine is aliline, toluidine, xylidine or mixtures of such mono-amines.

8. A process as claimed in claim 1 wherein the di-isocyanato component is phenylene, toluylene, ditolylene, naphthylene or diphenylene-methane di-isocyanate, or mixtures thereof.

9. A lubricating grease that has been prepared by the reaction of
(a) a mono-amino component consisting of a mixture of at least one representative of each of the classes of compounds of general formulae:

R—NH$_2$ and

R′—NH$_2$ in which R is a monovalent aliphatic and R′ is a monovalent aromatic radical,
(b) a diamino component of the general formula:

NH$_2$—R—O—R′—O—R″—NH$_2$, in which R, R′ and R″ are divalent aliphatic radicals,
(c) a di-isocyanato component consisting of an aromatic di-isocyanate or a mixture of aromatic di-isocyanates, the two isocyanate groups in the molecules being connected with the same aromatic ring or with different aromatic rings,
characterised in that the diamino component is:
4,17-dioxaeicosandiamine-1,20
having the formula

H$_2$N—(CH$_2$)$_3$—O—(CH$_2$)$_{12}$—O—(CH$_2$)$_3$—NH$_2$.

* * * * *

UNITED STATES PATENT AND TRADEMARK OFFICE
CERTIFICATE OF CORRECTION

PATENT NO. : 4,129,512
DATED : December 12, 1978
INVENTOR(S) : Alexander W. Kisselow, Peter K. Wulk It is certified that error appears in the above–identified patent and that said Letters Patent are hereby corrected as shown below:

In claim 7, line 2, change "aliline" to --aniline--.

Signed and Sealed this

Twentieth Day of March 1979

[SEAL]

Attest:

RUTH C. MASON
Attesting Officer

DONALD W. BANNER
Commissioner of Patents and Trademarks